(No Model.)
E. E. RIES.
UNDERGROUND CONDUIT FOR ELECTRIC RAILWAYS.
No. 409,757. Patented Aug. 27, 1889.
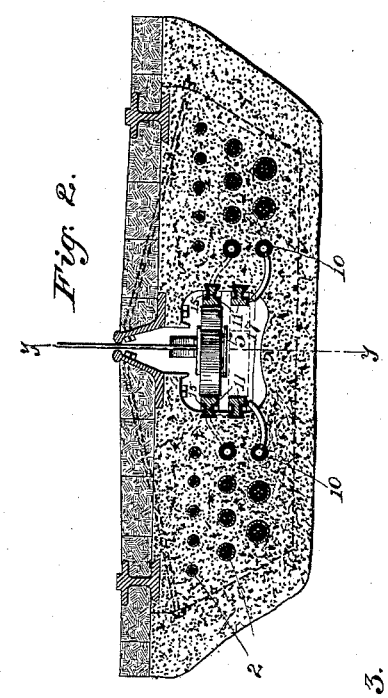
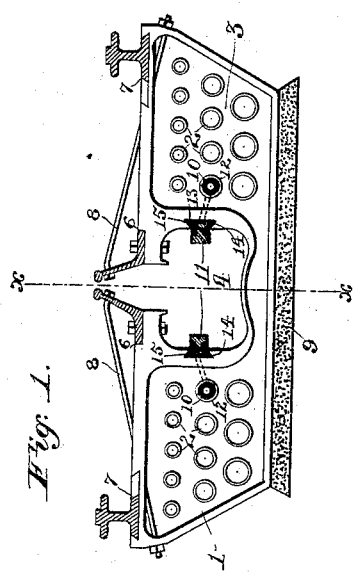
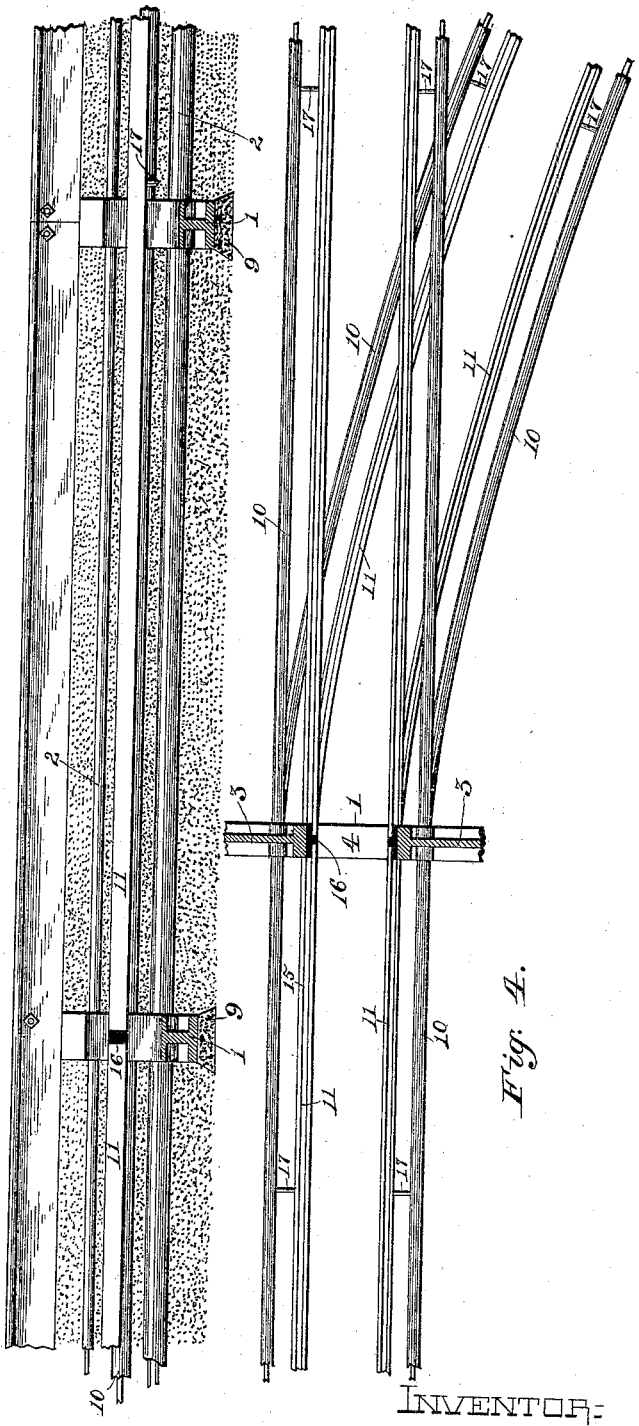
ATTEST:
Percy C. Bowen
Carl B. Waller
INVENTOR:
Elias E. Ries
By Harding & Tichenor
his Attorneys.

UNITED STATES PATENT OFFICE.

ELIAS E. RIES, OF BALTIMORE, MARYLAND, ASSIGNOR, BY DIRECT AND MESNE ASSIGNMENTS, TO RIES & HENDERSON, OF SAME PLACE.

UNDERGROUND CONDUIT FOR ELECTRIC RAILWAYS.

SPECIFICATION forming part of Letters Patent No. 409,757, dated August 27, 1889.

Application filed September 24, 1887. Serial No. 250,603. (No model.)

*To all whom it may concern:*

Be it known that I, ELIAS E. RIES, a citizen of the United States, residing at Baltimore, in the State of Maryland, have invented certain new and useful Improvements in Underground Conduits for Electric Railways; and I do hereby declare the following to be a full, clear, and exact description of the invention, such as will enable others skilled in the art to which it appertains to make and use the same.

My invention relates to a new and improved construction and arrangement of an underground conduit for the supply-conductors of electric railways, where the said conductors are organized and distributed in the form of "main" and "working" conductors, and also in case where two or more sets of supply-conductors are to be carried in a single slotted conduit, as will hereinafter appear.

In ordinary systems of underground conduits, involving the transmission of current to the vehicles from the generating-stations, the supply-conductors have been necessarily exposed throughout their entire length for contact with the current-collectors dependent from the traveling vehicles. As these conductors form the direct path of, and are constantly charged with, the electric current, their exposed condition in the conduit not only involves a considerable loss of current from leakage, due to the large surface exposed, but any accident to or interruption in the conductors would instantly cut off the flow of current through the circuit and interfere very seriously with the operation of the system. The constantly-charged condition of the supply-conductors also renders it extremely difficult and dangerous to make repairs of any kind to the conductors or the conduit itself while the cars are running on any portion of the system. Again, as is well known, the exposed condition of the line often gives rise to "short-circuiting," either by reason of the entrance of foreign matter through the slot-rails, or by the rise of water in the collector-channel. Moreover, the extreme length of the supply-conductors renders it necessary, in order to preserve the electrical continuity of the circuit, to join sections of the said conductors at intervals along the line; and, as it is necessary to make ample provision for expansion and contraction thereof, the joints thus made are more or less cumbersome and expensive, serving in some instances not only to obstruct the passage and divert the course of the traveling current-collecting wheels, but to greatly increase the electrical resistance of the line.

Other incidental objections not here enumerated result from the use in many localities of the direct supply-conductor systems just referred to.

Therefore, my invention has for its object to surmount and overcome the difficulties and objections inherent in systems of this character, and to provide an arrangement which will meet commercial requirements by its simplicity of construction, its durability and efficiency in use, and its cheapness in cost and maintenance.

For the attainment of these several objects my invention consists, essentially, in the arrangement of a conduit structure carrying main and working conductors, the former being insulated and protected by the conduit, while the latter are laid in sections along the line of travel of the current-collectors. The main conductors carry the outgoing and return current from the generating-station, and the working or exposed sections are in circuit, severally, with the main conductors by a branch shunt or loop.

My invention further comprises a double set of working sectional conductors carrying current of different potential, derived, respectively, from two sets of main conductors, which are insulated and protected by the water-proof insulated conduit, and are in circuit with their respective working sections or conductors by loops or shunts. In accordance with such arrangement, an adjustable current-collector makes contact with either set of working conductors, according to requirements. By this construction two electric motor-cars of independent lines may traverse in common the same line of way.

My invention consists, further, in certain details of construction, arrangement, and combination of parts, all of which will be described and claimed hereinafter.

Referring to the accompanying drawings, which form a component part of this application, Figure 1 is a view in side elevation of one of my improved conduit-supporting brackets, showing its construction and the relative arrangement and disposition of the main and working conductors in said conduit. Fig. 2 is a similar view between any two of the brackets shown in Fig. 1, showing the concrete-filling between the said brackets, the tubes or ducts for telegraph or telephone and other wires, and a similar arrangement of a double set of the main and working conductors. Fig. 3 is a longitudinal section on the lines $x\,x$ and $y\,y$ of Figs. 1 and 2, respectively, showing the relative arrangement of the supporting-brackets and the intermediate concrete filling, the length of each sectional working circuit, and the manner of insulating one section from the next adjacent section; and Fig. 4 is a diagram showing, conventionally, a main and branch conduit provided with my arrangement of the main and working conductors, (illustrated in Fig. 2.)

Like numbers of reference designate like or similar parts in all the several views of the drawings.

Before entering into a detailed description of the subject-matter of this invention it would be preferable to here state that the construction of the conduit proper shown in connection herewith is illustrated, described, and claimed in Letters Patent granted me, dated September 20, 1887, No. 370,283. Therefore the same will not be claimed herein, nor even described, except sufficiently to give a clear understanding of dependence of my invention, as herein disclosed, thereupon, as it will be evident that other forms of conduit having similar advantageous and co-operating features may be substituted for the one shown herewith.

Referring to the drawings by numbers, 1 indicates a supporting-bracket, which is first placed at intervals along the excavated conduit-bed, and then the tubes 2, for housing the different electric wires, are placed and joined in the circular apertures in the webs 3 of said brackets, extending from bracket to bracket. Then a filling of insulating non-absorbent concrete is poured in a plastic state in and around the tubes 2 and between the brackets, it being understood that the usual conduit core or former (not shown) is placed longitudinally and centrally throughout the conduit-bed, passing and conforming to the shape of the interior opening 4 of the brackets for the purpose of forming the collector-channel 5. Each bracket 1 is, as shown, provided with recesses 6 and 7 on its upper edge or face for the reception of the slot and track rails, respectively, which in turn are braced and supported by the transverse girder-rods 8 8, as shown in Fig. 1.

Beneath each supporting-bracket is laid a transverse foundation of concrete 9, for giving an elastic firm support and for resisting the wear and tear and pounding of surface traffic.

10 10 designate the main conductors, which are, as shown in Figs. 1 and 2, laid on each side of the conduit-opening 4 and the collector-channel 5, parallel and in proximity to the working conductors 11 11. These conductors 10 10 are continuous throughout their entire length, and are supported and insulated by the concrete filling between the brackets 1 1, and are arranged to pass through and be supported by a circular opening 12 in each of said brackets on both sides of the conduit-opening 4, said conductors 10 10 carrying the current supplied from a suitable generating-station, (not shown,) the conductor to the left in Fig. 1 being the outgoing and the one to the right the return conductor. Thus it will be seen that the main conductors are in a hermetically-sealed conduit or conductor-channel, so that no interruption or leakage will occur.

In practice it would be preferable to thoroughly insulate the main conductor or conductors throughout their entire length, so as to preclude the entrance or influence of any moisture which might find access thereto through the concrete filling between the brackets, and likewise the opening 12 might be interiorly coated with an insulating substance to prevent the expansion or contraction of either the conductor or bracket from producing a leakage, short circuit, or other deleterious result.

The working conductors 11 11 are, as shown clearly in Fig. 3, laid in an open or slotted conduit in an exposed condition in insulated sections of prescribed length, and are shown so arranged that each joint or terminal of a working section will terminate at every third bracket. However, this may be varied in practice at will, as the sections might terminate at every fifth as well as every third bracket. The said working conductors 11 11 are preferably of a T shape, and are supported at each bracket 1 by the dovetailed recessed insulators 13, which in turn are secured in corresponding recesses 14 14 in the walls of the interior opening 4 of each of said brackets. However, I do not wish to confine myself to any specified form or method of supporting and insulating the working conductors, as such does not form any essential part of this invention, and, furthermore, various arrangements for accomplishing this purpose may be found in my before-mentioned Letters Patent.

Between any two brackets 1 1 the base or shank 15 of each working conductor is embedded in and insulated and supported by the concrete filling, (see Fig. 2,) it being understood that it would be necessary to first place the said conducting-rails in their proper positions before the plastic concrete is introduced, and consequently it will again be apparent that the conduit former or core would have to be suitably recessed in order to receive the portions of said conductors which project into the collector-channel 5.

Each working section is insulated from that next adjacent by a piece of insulation 16, (see Fig. 3,) and is connected with its main conductor 10 by an insulated transverse loop or branch 17, which may be secured at one end to either the under or rear side of the rail, and at its other end is permanently in electrical contact with the main conductor. This loop may pass through a suitable perforation (not shown) in the bracket, or may be connected with its respective conductors 10 and 11 through the concrete filling, these relative constructions depending entirely upon the character of the conduit in which my invention is located.

In Figs. 2 and 4 I have shown two sets of main and working conductors, for the purpose of illustrating my arrangement as applied to a conduit which contains the conductors of two different and distinct railway-lines, one set of main and working conductors carrying a different potential than the other. This construction would be applicable to any conduit occupying a street into which another line or conduit branches for a certain distance; or such double construction of working conductors might be used in conjunction with a single line of electric railway in which the motor-cars are each provided with a dependent vertically-adjustable current-collector adapted to make contact with either set of the conductors 11 11 by any one of the well-known mechanical means. By such latter arrangement the propelling-motor might receive current from either set of conductors on account of the nature of the grade, the presence of an accident or casualty, or other reason; or the vehicle could by this construction be enabled to develop more power or run at different relative speeds under certain conditions by the simple manipulation of the collector-wheels.

As will be seen by an inspection of Figs. 1 and 2, the under sides of the conducting-rails 11 11 are coated with insulation, the upper face and outward side being left bare for contact with the traveling contact-wheels dependent from the car, the obvious object of such construction being to diminish leakage.

Thus it will be understood from the foregoing description, taken in conjunction with the accompanying drawings, that if any accident—such as an injury to the motor or a break in the working conductors—occurs on any working section, none of the other sections is influenced in the least, thereby avoiding the necessity of impeding all other travel if an accident occurs to the working line at any point.

If, from any unforeseen contingency or casualty, the current in any working section should become interrupted, the previous impetus of the traveling vehicle would be sufficient to propel it across the comparatively short impaired section.

As before stated, each working section is normally open-circuited, and is never closed except automatically by the passage of a motor thereacross, or, more properly speaking, by the contact of the collecting-wheels of the motor with the rails of a particular working section, and repairs to a given section can at any time be made with entire safety and without interfering with the operation of the motor-cars. Finally, it will appear that the conductor-channels respectively carrying the main and working conductors are coextensive, one being sealed while the other is open.

Having thus fully described my invention, what I claim, and desire to secure by Letters Patent of the United States, is—

1. In an electric railway, the combination of two coextensive underground conductor-channels, one hermetically closed, the other slotted or open, a continuous main conductor laid in the said closed conductor channel, and a series of insulated sectional working conductors having exposed surfaces and laid in the slotted or open conductor-channel, each working conductor being electrically connected with a main conductor, as and for the purpose hereinbefore set forth.

2. In an electric railway, the combination, with a slotted underground conduit structure, of two or more coextensive hermetically-sealed conductor-channels, continuous main conductors in the said sealed channels, and two or more series of insulated working conductors having exposed contact-surfaces also laid in said conduit, each working conductor being electrically connected to the main conductor corresponding to its respective series.

3. The combination, with a single conduit structure comprising two conductor-channels, of main conductors laid in one channel hermetically sealed, a series of exposed working conductors placed in the other channel and severally electrically connected with said main conductors, and a current-collector or its equivalent adapted to travel in contact with said working conductors.

4. The combination, with a conduit structure, of a dual set of insulated exposed working conductors located in said conduit in different horizontal planes, each set carrying current differing in tension from that of the other set, and a traveling vehicle provided with an adjustable depending current-collector adapted to make contact with either set of working conductors.

In testimony whereof I affix my signature in presence of two witnesses.

ELIAS E. RIES.

Witnesses:
   JNO. T. MADDOX,
   GEO. H. TICHENOR.